May 23, 1950
F. A. TANN ET AL
2,508,806
VALVE CONTROL FOR SERVOMOTORS
Filed March 18, 1946
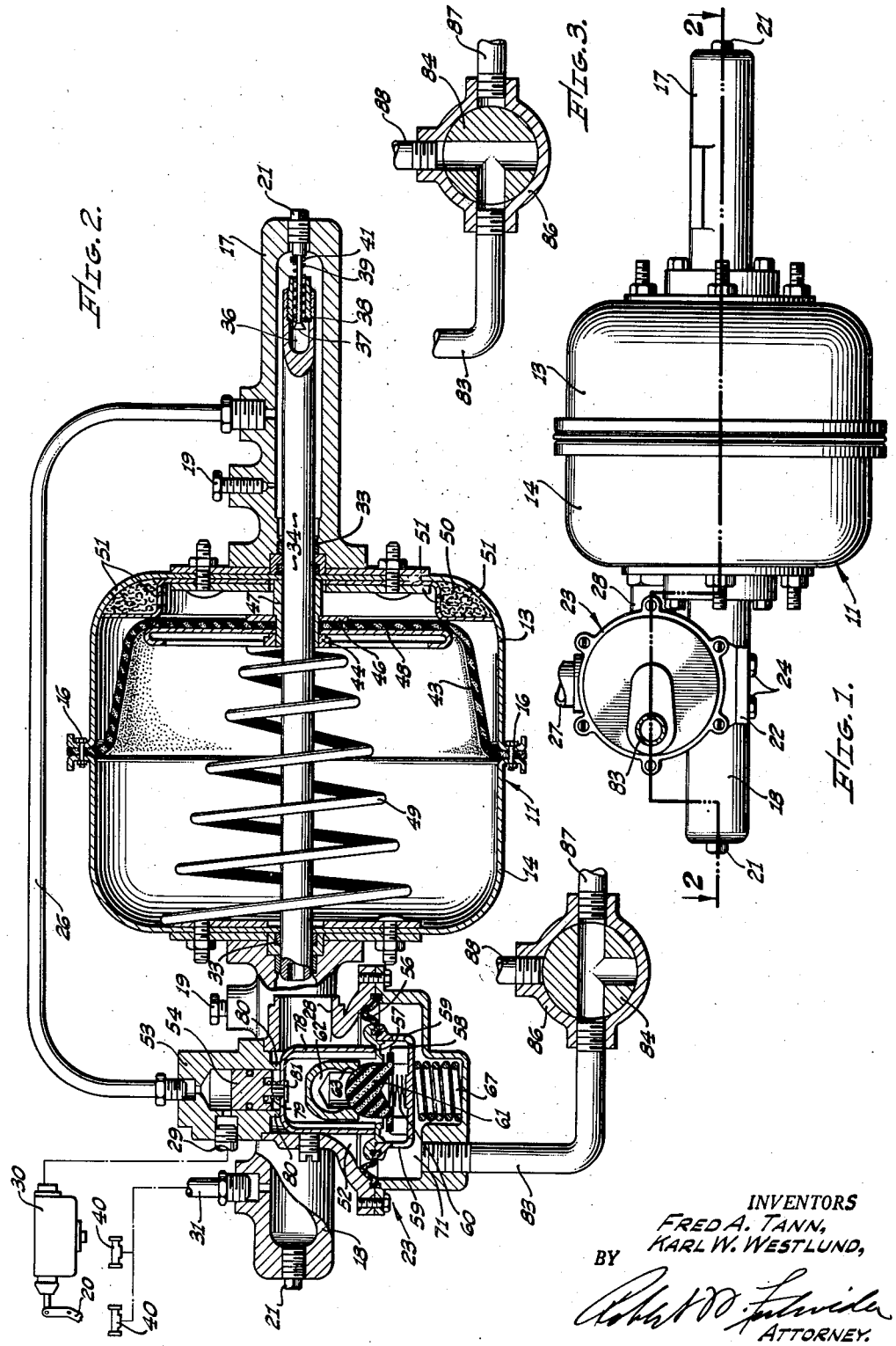
INVENTORS
FRED A. TANN,
KARL W. WESTLUND,
BY
ATTORNEY.

Patented May 23, 1950

2,508,806

UNITED STATES PATENT OFFICE 2,508,806

VALVE CONTROL FOR SERVOMOTORS

Fred A. Tann and Karl W. Westlund, Los Angeles, Calif., assignors to Roadmaster Products Company, Los Angeles, Calif., a corporation of California Application March 18, 1946, Serial No. 655,031

5 Claims. (Cl. 60—54.5)

The present invention relates generally to brake power booster units for trucks and more particularly to a power booster unit characterized by its great power and by its adaptability to control selectively by the usual brake pedal and by a manual "parking" valve. More specifically the invention comprises an air-actuated brake booster unit controlled by valve means which is positioned hydraulically by the usual brake pedal and which is also under the control of a "parking" valve.

It is an object of the present invention to provide a new and improved power booster unit for hydraulic brakes which is adapted to be connected between the brake pedal and brake-actuating cylinders to increase greatly the pressure acting upon the brakes, means being provided by which the unit is actuated to lock the brakes when the vehicle is parked.

A further object of the invention is to provide an improved booster unit for hydraulic brakes in which the power cylinder of the unit is selectively controlled hydraulically from the vehicle brake pedal and manually by means using air pressure.

Referring now to the drawing in which a preferred embodiment of the invention is disclosed:

Figure 1 is a plan view of the unit constructed in accordance with the present invention;

Figure 2 is a vertical section upon the line 2—2 of Figure 1 and shows the movable parts of the unit in their normal inoperative positions; and Figure 3 is a diagrammatic showing of the manually controlled suction valve in its operative or "parking" position.

The present invention is an improvement upon the invention disclosed and claimed in the copending application Serial No. 627,243, filed November 7, 1945.

The problem of providing adequate braking power in vehicles weighing several tons and designed to travel at high speeds over the highway is one which has received a great deal of careful consideration. Mechanical brakes are useful but are definitely limited as to the braking power which they can provide with the exertion of only a reasonable force by the driver. In the past hydraulic brakes have been incorporated into such vehicles successfully but in order to provide sufficient braking power require the provision of a power booster unit. The present invention is directed to such a booster unit in which the application by the operator of a reasonable force of approximately thirty-five pounds at the foot pedal is increased to a force of over one thousand pounds at the brake. The usual booster unit in commercial use today is incapable of a multiplication of power in this ratio. In addition to its ability to amplify the power at the braking surface, the unit constructed in accordance with the present invention is provided with means by which the power cylinder can be held in the "brake on" position for an extended period of time. This capability makes it possible for the operator to park the vehicle and to leave it with the brake securely on. This last function is obtained by placing the booster unit under the control of a manually operable air valve in addition to its control by the vehicle foot pedal.

Referring again to the drawing, the booster unit constructed in accordance with the present invention is seen to comprise a power cylinder 11, the casing or shell of which is formed of two half shells 13 and 14 secured centrally at their peripheral flanges by a plurality of bolts 16. Extending fixedly from the side of shell 13 is a cylinder 17 and from the outer side of shell 14 an aligned cylinder 18. Cylinder 17 is known as the pressure or fluid transfer chamber while cylinder 18 is called the power or high pressure chamber. The two cylinders 17 and 18 are aligned and each is provided with a removable air bleed plug 19 on its upper side and with a plug or bolt 21 at its outer end. If the unit is to be operated in a reversed position, the bleed plugs 19 obviously would be positioned upon the opposite sides of the cylinders to permit of the escape of trapped air.

From the cylinder 18 extends a rigid integral bracket 22 to which the control valve assembly, indicated generally by the reference character 23, is secured as by bolts 24. It is the function of the valve assembly to control the operation of the booster unit responsive to the control indications which are given to it. Necessarily the assembly 23 is connected to various other parts of the unit. A fluid conduit 26 extends from the assembly to the transfer chamber 17. An air conduit 27 extends from the side of the valve assembly and is adapted to be connected to a point of suction or vacuum such as the vehicle manifold. Still another conduit bearing the reference character 28 connects the interior of the valve assembly to the interior of the power chamber at the section 14 thereof, and provides means by which air is exhausted from the power cylinder. A fluid conduit bearing the reference character 29 also connects to the valve assembly and is adapted to be connected directly to a master cylinder 30 under the control of a foot-actuated brake pedal 20. Also, there is a conduit 31 extended from the high pressure cylinder 18 to the individual brake cylinders 40 which operate directly upon the vehicle brakes.

A plunger or piston 34 formed with a longitudinal passageway 36 extends through chamber 11 and is slidably mounted in sealed bearings 33 in the opposite walls of the chamber, its extremities being positioned within the fluid chamber 17 and the high pressure chamber 18. The end of conduit 36 within the fluid chamber 17 is closed by a valve 37 normally pressed by a compression coil spring 39 encircling its stem into closing sealing relationship with its valve seat 38 screw-threaded into the end of plunger 34. The inner end of spring 39 abuts the valve seat 38 while its outer end contacts a cotter pin 41 on the valve stem to hold the valve in closed position in the absence of an overcoming force.

In the drawing, and in Figure 2 in particular, the power unit is shown in its normal or inoperative relationship. The piston 34 has its maximum extension into the chamber 17 and the valve 37 is open, the end of its stem having contacted the bolt 21 to move the valve from its seat against the action of coil spring 39. With the valve open, conduit 36 in plunger 34 is connected interiorly to chamber 17 and through the latter and conduit 26 to the valve assembly 23. Movement of the plunger or piston 34 in the direction of cylinder 18 through a predetermined distance moves the valve stem from the bolt 21 and spring 39 effects the closure of the valve 37 upon its seat.

The opposite end of plunger 34 is positioned, as previously described, within the high pressure fluid chamber 18, its point of entrance being closed by the sealed bearing 33 in the shell section 14. The interior wall surfaces of the cylinder 18 are not necessarily finished for the piston 34 does not move in contact therewith. Instead the pressure of the fluid within the cylinder 18 is varied by physical displacement of the piston therein. Variations in the pressure of the oil within the cylinder 18 are immediately effective through the conduit 31 to the brake cylinders 40.

Within power chamber 11 is a flexible bellows or diaphragm 43, the peripheral edge of which is clamped between the annular flanges of shell sertions 13 and 14 by the bolts 16. Diaphragm 43 is sealed to the piston 34 seating thereon in air-tight relationship through being secured centrally to a fixed sleeve 47 on the piston. A plate 48 with rounded peripheral edges holds the diaphragm 43 in extended relationship and the plate and the diaphragm are centrally clamped together and to the sleeve 47 by means of fixed washers 44 and 46 so that any movement of the diaphragm and plate 48 is accompanied by a corresponding displacement of the piston 34.

The bellows or diaphragm 43 is urged at all times in a direction to move piston 34 into oil chamber 17 by a helical coil spring 49 which abuts the movable diaphragm plate at one end and the wall of the shell section 14 at its opposite end. In the limiting at rest position of the bellows, the sleeve 47 fixed upon piston 34 contacts the side wall of shell section 13 and it is in this position, it is to be noted, that the valve 37 is held open by its contact with the plug 21.

The piston 34 is adapted to be actuated by the pressure differential across the bellows 43 and within the chamber 11. The bellows is exposed to atmospheric pressure upon its side facing shell section 13 and the latter is provided in its end wall, which is made double for the purpose, with spaced apertures 51 between which is positioned a ring of air-filtering material 50. The latter offers no appreciable resistance to air flow and the interior of the shell section 13 has at all times the pressure of the ambient atmosphere. The opposite side of the diaphragm 43 together with the shell section 14 forms a chamber which is interiorly connected by means of the aforementioned conduit 28 to the interior of the valve 23 and specifically to the outlet chamber 52 therein. The valve assembly 23 functions to control the connection of the power chamber to the actuating source of suction and will now be described.

Turning now to the control valve assembly 23, the outlet chamber 52 is closed at its top by an oil cylinder 53 and enclosed piston 54. The aforedescribed oil conduits 26 and 29 connect to the chamber 53 above the piston 54 and upon the reception of oil under pressure through the conduit 29 from the brake-pedal-actuated master cylinder 30, piston 54 is adapted to move toward the suction chamber 52. The lower side of the chamber 52 is defined by a movable flexible diaphragm 56 secured peripherally to the side walls of the valve chamber and carrying centrally a rigid circular abutment or contact plate 57 to which is secured a cup structure 58 formed with a plurality of apertures 59. A generally hemispherical poppet valve 61 of resilient flexible material, such as rubber, is positioned within the valve assembly and is formed at one end with a peripheral flange adapted to make sealing contact with the inner rim of contact plate 57. Valve 61 is at all times urged by a coil spring 60 abutting the inner side of cup 58 in a direction to seat its flange upon the plate 57. With the poppet valve 61 sealed at its flange or rim to plate 57 a chamber 71 is formed within the valve casing distinct from the outlet chamber 52. With the poppet valve flange unseated from the contact plate 57, however, outlet chamber 52 and inlet chamber 71 are interconnected by the opening between the valve 61 and the plate 57.

Dimensionally within outlet chamber 52 of the valve assembly is a valve chamber 62 connected directly to the conduit 27 which leads to the source of suction in the vehicle. Valve chamber 62 is formed on one side with a port or valve seat 63 which opens directly into the outlet chamber 52 but which is adapted to seat and be closed by the poppet valve 61 in the manner shown in Figure 2 of the drawings. Normally, in the inoperative relationship, the valve chamber 62 is closed by the valve 61, the suction within the valve chamber holding the valve in place aided by the action of coil spring 60. The contact plate 57 is held from contact with the rim of the valve by the force exerted by a coil spring 67 abutting the top of the valve chamber and the bottom of cup 58.

To displace the poppet valve 61 from its sealing contact with the valve chamber 62, and so connect the latter through the outlet chamber 52 to the interior of the power chamber 11, means are provided to move the contact plate 57 and through it to displace the poppet valve from its seating position. These means comprise a U-shaped strap or bracket 78 the arms of which extend at the sides of valve chamber 62 and into contact at their ends with the contact plate 57. The central portion of U bracket 78 is slidably mounted upon the piston 54, being urged therefrom by a compression spring 79 to the outermost position permitted by a headed screw 81. In the inoperative position the bracket 78 seats upon abutment 80 extended into the outlet chamber 52 at the sides of the cylinder 53 being held thereagainst by the force exerted by the coil spring 67 through the cup 58 and contact plate 57.

The inlet chamber 71, within the valve assembly 23 connects through a conduit 83 to a manually operable control valve 84 positioned within its casing 86 to which connect conduits 87 and 88 leading respectively to atmosphere and to a source of vacuum in the vehicle to be controlled. In the normal operation of the vehicle when the operator would desire to control any breaking operation by the foot pedal 20, the rotatable valve 84 would be positioned as shown in Figure 2 of the drawings and the interior of chamber 71 would be at atmospheric pressure. When it is desired, however, to lock the brakes, as with the vehicle parked, valve 84 is rotated to the position shown in Figure 3 and air is exhausted from chamber 71 so that it becomes in effect a source of suction similar to the valve chamber 62.

The operation of the unit under the control of the vehicle brake pedal 20 will now be described.

When the vehicle is proceeding without need for braking, the relationship of the parts is as shown in Figure 2. The poppet valve 61 seals the suction in valve chamber 62 from the outlet chamber 52 and so from the power chamber 11. The piston 34 is forced by the coil spring 49 as far into the shell 13 as permitted by the contact of its fixed sleeve 47 with the side wall of the shell. The valve 37 in the piston is held open by its abutting contact with the plug 21 and against the force of its compression spring 39. Within the valve assembly 23 the abutment plate 57, movable with the diaphragm 56, is spaced from the flanged rim of the valve 61 and the interior of the outlet chamber 52 and chamber 71 are interconnected by the space between the valve rim and the plate 57, both chambers being at atmospheric pressure as the valve 84 is positioned to connect to atmosphere via the conduit 87.

If it is now assumed that the vehicle is to be braked, the operator exerts a force upon the brake pedal 20, thereupon actuating an unshown piston in the master cylinder 30 and creating a fluid pressure effective through the conduit 29 upon the piston 54 in the fluid cylinder 53. The increase in pressure effected by the master cylinder is also effective in the low pressure or fluid transfer cylinder 17 which is connected to cylinder 53 by conduit 26, and fluid is forced past valve 37 and through the hollow plunger or piston 34 and into the high pressure cylinder 18. From the latter it is effective through the conduit 31 to brake-actuating cylinders 40 at the individual wheels of the vehicle. The described fluid pressure increase effected immediately by the foot pedal 20 is sufficient to take up any play in the system and to bring the brakes into operative contact with the brake drums.

The exertion of a slightly greater pressure upon the foot pedal increases the pressure within the oil cylinder 53 of the valve assembly 23 and propels the piston 54 in the direction of the outlet chamber 52 and against the restraining force of the coil spring 67 acting through the cup 58, contact plate 57, strap or bracket 78 and coil spring 79. Upon contact plate 57 moving into contact with the rim of the resilient poppet valve 61, that element is lifted from its sealing contact with its seat 63 on the valve chamber 62. Immediately the suction within that chamber, which is ever present by virtue of its connection to the vehicle manifold through the conduit 27, is effective within the outlet chamber 52. The latter is now sealed from the inlet chamber 71, which is at atmospheric pressure by virtue of the sealing contact of the rim of the poppet valve with the plate 57 of the diaphragm. Air is immediately drawn into the valve chamber 62 from the power chamber 11 via the conduit 28 and the outlet chamber 52 and is exhausted to the source of suction through conduit 27.

The withdrawal of air from the power chamber 11 places a pressure differential across the diaphragm 43. Atmospheric pressure continues to be exerted upon that side of the diaphragm facing the shell section 13 while the opposite side facing the shell 14 is now exposed to a pressure less than atmospheric. This pressure differential acting upon the entire area of the bellows causes the diaphragm, its supporting plate 48, the sleeve 47, and the piston 34 to travel as to move the piston 34 into the high pressure oil cylinder 18 and against the opposing force exerted by the coil spring 49. After but a slight movement of the piston 34, the valve 37 is closed and thereafter the piston is in effect a solid plunger moving into the high pressure oil chamber 18, such movement effecting an increase in the pressure therein which is directly effective through the connected conduit 31 to the brake-actuating cylinders 40.

When the operator releases the foot pedal 20, the pressure effective through the conduit 29 and acting upon the valve piston 54 is also released. Thereupon the piston is returned to its initial position by the coil spring 67 acting upon the cup 58, collar 57, bracket 78 and spring 79. The travel of the plate or collar 57 effects its separation from the rim of valve 61 when the latter seats upon its seat 63 in valve chamber 62 to seal the source of suction from the power chamber. The separation of the collar 57 from the rim of the valve 61 also effects the reconnection of the outlet chamber 52 to the inlet chamber 71. Air at atmospheric pressure then passes from chamber 52 through conduit 28 and into the interior of power chamber 11, thereby enabling the coil spring 49 to return the bellows 43 and plunger 34 to their initial positions, whereupon the brakes are released.

Should the operator desire to lock the brakes in braking position, as when parking, the rotary valve 84 is turned until the suction conduit 88 is connected to conduit 83 leading to the chamber 71 of the valve assembly 23. This operation if performed without prior operation of the foot pedal 20 finds the poppet valve 61 and the collar 57 separated as shown in Figure 2. In this event the suction provided within the chamber 71 by the conduit 83 is immediately effective within chamber 52, conduit 28 and power chamber 11. The presence of suction within chamber 11 effects the collapse of the bellows 43 against the action of spring 49 and the movement of piston 34 into power cylinder 18 whereupon the brakes are applied as described above in connection with the foot pedal operation.

In the event that the parking brake valve 84 is positioned to make suction available to the chamber 71 immediately during the operation of foot pedal 20, or so nearly thereafter that the collar 57 is sealed to the flange or rim of the valve 61, then the chamber 71 would be sealed by this contact from chamber 52 and the suction in chamber 71 would not be effective directly into the power chamber. Instead it would effect a lifting of the movable diaphragm 56, the collar 57 and the valve 61 and retain the direct connection between the valve chamber 62, and the power chamber 11. In this last event, the brake-actuating power applied to the brakes would be derived in the same manner as though the foot brake were applied, the difference being that the poppet valve 61 would be held in open position by means of the suction within the chamber 71 rather than by means of the pedal-provided hydraulic pressure effected through piston 54 and bracket 78.

As to the operation of the parking brake valve, the operator need only turn the rotatable valve element 84 to connect the source of suction at the conduit 88 to the valve unit 23. Immediately the bellows or diaphragm 43 is collapsed and the brakes are applied and remain locked until the valve is repositioned as to connect chamber 71 to atmospheric pressure.

While the particular unit herein shown and described in detail is fully capable of attaining the objects and providing the advantages hereinbefore stated, it is to be understood that it is merely illustrative of the presently preferred embodiments of our invention, and that we do not mean to limit ourselves to the details of construction or design herein shown, other than as defined in the appended claims.

We claim:

1. A control valve for a pressure booster unit of the air-actuated type comprising: a casing, an inlet chamber in said casing, an outlet chamber in said casing adapted to be connected to the power cylinder of said unit, dividing means between said chambers including a movable valve and a diaphragm sealed to said casing and adapted to be sealed to said valve, a valve port adapted to seat said valve in said outlet chamber and through which air is withdrawn, resilient means acting on said diaphragm to separate it from said valve with said valve seated on said port, said chambers being interconnected with said valve and diaphragm separated, means to move said diaphragm into sealing contact with said valve to seal said chambers and to lift said valve from said port to enable air to be withdrawn from said outlet chamber and from a power cylinder connected thereto, and independently operable valve means to connect said inlet chamber selectively to air at atmospheric pressure or to a source of suction.

2. A control valve for a pressure booster unit of the air-actuated type comprising: a casing, an inlet chamber in said casing, an outlet chamber in said casing adapted to be connected to the power cylinder of said unit, dividing means between said chambers including a first movable valve and a diaphragm sealed to said casing and adapted to be sealed to said first valve, a valve port adapted to seat said first valve in said outlet chamber and through which air is withdrawn, resilient means acting on said diaphragm to separate it from said valve with said first valve seated on said port, said chambers being interconnected with said first valve and diaphragm separated, hydraulically-actuated means to move said diaphragm into sealing contact with said first valve to seal said chambers and to lift said first valve from said port to enable air to be withdrawn from said outlet chamber and from a power cylinder connected thereto, and independent valve means to connect said inlet chamber selectively to air at atmospheric pressure or to a source of suction whereby with said first valve seated on said port said chambers are interconnected and any suction within said inlet chamber is available through said outlet chamber to a power cylinder connected thereto.

3. A pressure-booster unit for a hydraulic braking system of the type having an operator-operated pedal to create pressure in an operating fluid and a fluid-pressure-operated brake motor, comprising: an air-pressure operated power unit having a casing and a movable diaphragm therein, air-conducting means to connect said casing on one side of said diaphragm to a source of suction, a high pressure fluid chamber adapted to be connected hydraulically to said brake, a piston connected to and movable with said diaphragm extended into said high pressure cylinder and adapted to move thereinto to increase the pressure of a fluid therein, and valve means controlling the flow of air through said air-conducting means into and from said casing, said valve means including inlet and outlet chambers adapted to be connected to a source of suction, manually operable valve means adapted for selective connection to atmospheric or sub-atmospheric pressures to control the pressure in said inlet chamber, movable means controlling the flow of air through said valve chambers and adapted to seal said chambers from each other, and hydraulic means to position said movable valve means.

4. In a pressure booster unit for augmenting hydraulic pressure in a system of the type which includes a hydraulic pressure piston actuated by an air motor, a control assembly comprising in combination: means forming an enclosure having a first chamber communicated with said motor and a second chamber adapted to be sealed from said first chamber; first conduit means to communicate said first chamber with a source of air pressure different from atmosphere; second conduit means to communicate said second chamber with said air pressure source; first valve means in said enclosure adapted to normally close said first conduit means and to mutually communicate said chambers, said first valve means being operable to seal said chambers and open said first conduit means; hydraulic motor means responsive to increase in said hydraulic pressure to operate said first valve means whereby to concurrently seal said chambers and communicate said air motor with said pressure source whereby to operate said motor to augment said hydraulic pressures; and second valve means in said second conduit normally blocking the same and opening said second chamber to atmosphere, said second valve means being independently operable to open said conduit and seal said second chamber from atmosphere whereby to independently operate said air motor.

5. In a pressure booster unit for augmenting the hydraulic pressure in a system of the type which includes a hydraulic pressure piston actuated by an air motor, a control assembly comprising in combination: means forming a pair of chambers, a first of which is in communication with said air motor whereby to operate the same in response to non-atmospheric pressure in said first chamber; first passage means to communicate said first chamber with a source of non-atmospheric pressure; normally closed valve means in said first passage means including a hydraulic motor responsive to increase of pressure in said hydraulic system to open said first passage means; normally open valve means between said chambers, said normally open valve means being operatively connected with said hydraulic motor whereby to hermetically seal said first chamber concurrently with opening of said passage; and valve and passage means connected to the second of said chambers and adapted to communicate said second chamber selectively with a source of non-atmospheric pressure or to atmosphere.

FRED A. TANN.
KARL W. WESTLUND.

REFERENCES CITED

The following references are of record in the file of this patent:

UNITED STATES PATENTS

| Number | Name | Date |
|---|---|---|
| 1,817,800 | Bragg | Aug. 4, 1931 |
| 2,232,974 | Roy | Feb. 25, 1941 |
| 2,366,127 | Rappl | Dec. 26, 1944 |
| 2,406,328 | Gunderson | Aug. 27, 1946 |